US012590865B2

(12) United States Patent
Mock et al.

(10) Patent No.: US 12,590,865 B2
(45) Date of Patent: Mar. 31, 2026

(54) MEASURING FIBER INSERTION LOSSES IN AN OPTICAL FIBER SENSING SYSTEM

(71) Applicant: LUNA INNOVATIONS INCORPORATED, Roanoke, VA (US)

(72) Inventors: Joel Leslie Mock, Roanoke, VA (US); Stephen Tod Kreger, Roanoke, VA (US); Justin Lee Stay, Roanoke, VA (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 96 days.

(21) Appl. No.: 18/702,381

(22) PCT Filed: Oct. 19, 2022

(86) PCT No.: PCT/US2022/047098
§ 371 (c)(1),
(2) Date: Apr. 18, 2024

(87) PCT Pub. No.: WO2023/069492
PCT Pub. Date: Apr. 27, 2023

(65) Prior Publication Data
US 2025/0251302 A1      Aug. 7, 2025

Related U.S. Application Data

(60) Provisional application No. 63/257,612, filed on Oct. 20, 2021.

(51) Int. Cl.
*G01M 11/00* (2006.01)
*G01D 5/353* (2006.01)
*H04B 10/073* (2013.01)

(52) U.S. Cl.
CPC ......... *G01M 11/31* (2013.01); *G01D 5/35316* (2013.01); *G01M 11/3145* (2013.01); *G01M 11/33* (2013.01); *H04B 10/0731* (2013.01)

(58) Field of Classification Search
CPC .......... H04B 10/0731; H04B 10/07955; H04B 10/071; H04B 10/0775; G01D 5/35383;
(Continued)

(56) References Cited

U.S. PATENT DOCUMENTS 4,304,489 A * 12/1981 Wakabayashi ......... G01M 11/00
356/73.1
4,685,799 A * 8/1987 Brininstool .......... G01M 11/335
356/73.1
(Continued)

OTHER PUBLICATIONS

International Search Report and Written Opinion of the ISA for PCT/US2022/047098 dated Jan. 27, 2023, 8 pages.
(Continued)

*Primary Examiner* — Gordon J Stock, Jr.
(74) *Attorney, Agent, or Firm* — NIXON & VANDERHYE P.C.

(57) ABSTRACT

An optical fiber has at least one optical sensor with at least two interconnects with associated insertion losses. A first optical sensing interrogator is coupled through an interconnect to one end of the optical fiber with the sensors, and a second optical sensing interrogator is coupled through an interconnect to an opposite end of the optical fiber on an opposite side of the sensors. The first optical sensing interrogator and the second optical sensing interrogator determine one or more fiber insertion losses associated with the optical path in between the sensors and the interrogators, and between sensors if there are two or more sensors, without foreknowledge of the sensor reflectivity.

20 Claims, 11 Drawing Sheets

X = Fiber Optic Connector
||| = FBG

(58) Field of Classification Search
CPC .......... G01D 5/35358; G01D 5/35316; G01D
5/35354; G01D 5/35361; G01D 5/268;
G01D 5/353; G01D 5/35303; G01D
5/35306; G01D 5/35312; G01D 5/35319;
G01D 5/3537; G01D 5/35374; G01D
5/35377; G01D 5/3538; G01D 5/35338;
G01D 5/35341; G01D 5/35345; G01D
5/35348; G01D 5/35351; G01D 5/35367;
G01D 5/35364; G01D 5/35387; G01D
5/3539; G01D 5/35393; G01D 5/35396;
G01M 11/00; G01M 11/30; G01M 11/31;
G01M 11/3109; G01M 11/3118; G01M
11/3127; G01M 11/3136; G01M 11/3145;
G01M 11/3154; G01M 11/3163; G01M
11/3172; G01M 11/3181; G01M 11/319;
G01M 11/33; G01M 11/331; G01M
11/332; G01M 11/333; G01M 11/334;
G01M 11/335; G01M 11/336; G01M
11/337; G01M 11/338
See application file for complete search history.

(56) References Cited

U.S. PATENT DOCUMENTS

| | | | | |
|---|---|---|---|---|
| 5,078,489 | A * | 1/1992 | Lieber | G01M 11/35 |
| | | | | 356/73.1 |
| 5,144,125 | A * | 9/1992 | Carter | G08B 17/02 |
| | | | | 250/227.15 |
| 6,185,020 | B1 * | 2/2001 | Horiuchi | H04B 10/07 |
| | | | | 398/31 |
| 6,917,750 | B2 * | 7/2005 | Stegall | G01M 11/336 |
| | | | | 385/147 |
| 7,756,418 | B2 * | 7/2010 | Ofalt | H04B 10/07955 |
| | | | | 356/73.1 |
| 9,749,043 | B2 * | 8/2017 | Perron | G01M 11/33 |
| 9,791,335 | B2 * | 10/2017 | Kwon | G01B 11/16 |
| 10,139,274 | B2 * | 11/2018 | Schell | G01J 1/44 |
| 10,161,829 | B2 * | 12/2018 | Brillhart | H04B 10/07955 |
| 10,416,040 | B1 * | 9/2019 | Prescott | G01M 11/33 |
| 10,634,524 | B2 | 4/2020 | Miller | |
| 10,727,938 | B2 * | 7/2020 | Haber | H04B 10/071 |
| 10,914,655 | B2 * | 2/2021 | Roux | G01M 11/3145 |
| 11,022,761 | B2 * | 6/2021 | Miller | G02B 6/385 |
| 11,280,687 | B2 * | 3/2022 | Champavere | G01D 5/35361 |
| 11,470,117 | B2 * | 10/2022 | Huang | H04B 10/0775 |
| 11,906,389 | B1 * | 2/2024 | Perron | H04B 10/071 |
| 12,206,449 | B1 * | 1/2025 | Campos | H04B 10/071 |
| 2004/0113056 | A1 | 6/2004 | Everall et al. | |
| 2007/0025681 | A1 | 2/2007 | Turner | |
| 2009/0033919 | A1 | 2/2009 | He et al. | |
| 2009/0126501 | A1 * | 5/2009 | Ferguson | G01L 1/246 |
| | | | | 73/800 |
| 2016/0337034 | A1 * | 11/2016 | Ruchet | H04B 10/2581 |
| 2016/0356670 | A1 | 12/2016 | Brillhart et al. | |
| 2020/0173818 | A1 * | 6/2020 | Handerek | G01K 11/32 |

OTHER PUBLICATIONS

Extended European Search Report for EP Application No. 22884397.5 dated Jan. 14, 2025, 10 pages.

Yusuke Koshikiya, "Newly Developed Optical Fiber Line Testing System Employing Bi-Directional OTDRs for PON and In-Service Line Testing Criteria" IEICE Transaction on Communication., vol. E90-B, No. 10, Oct. 2007, pp. 2793-2802.

\* cited by examiner

Receive Cable

Cable to Test

Launch Cable

Laser Transmitter

Receiver & Signal Processor

☐ Fiber Optic Interconnect

OSI = Optical Sensing Interrogator
X = Optical Connector or Splice
FBG = Fiber Bragg Grating X = Fiber Optic Connector
≡ = FBG

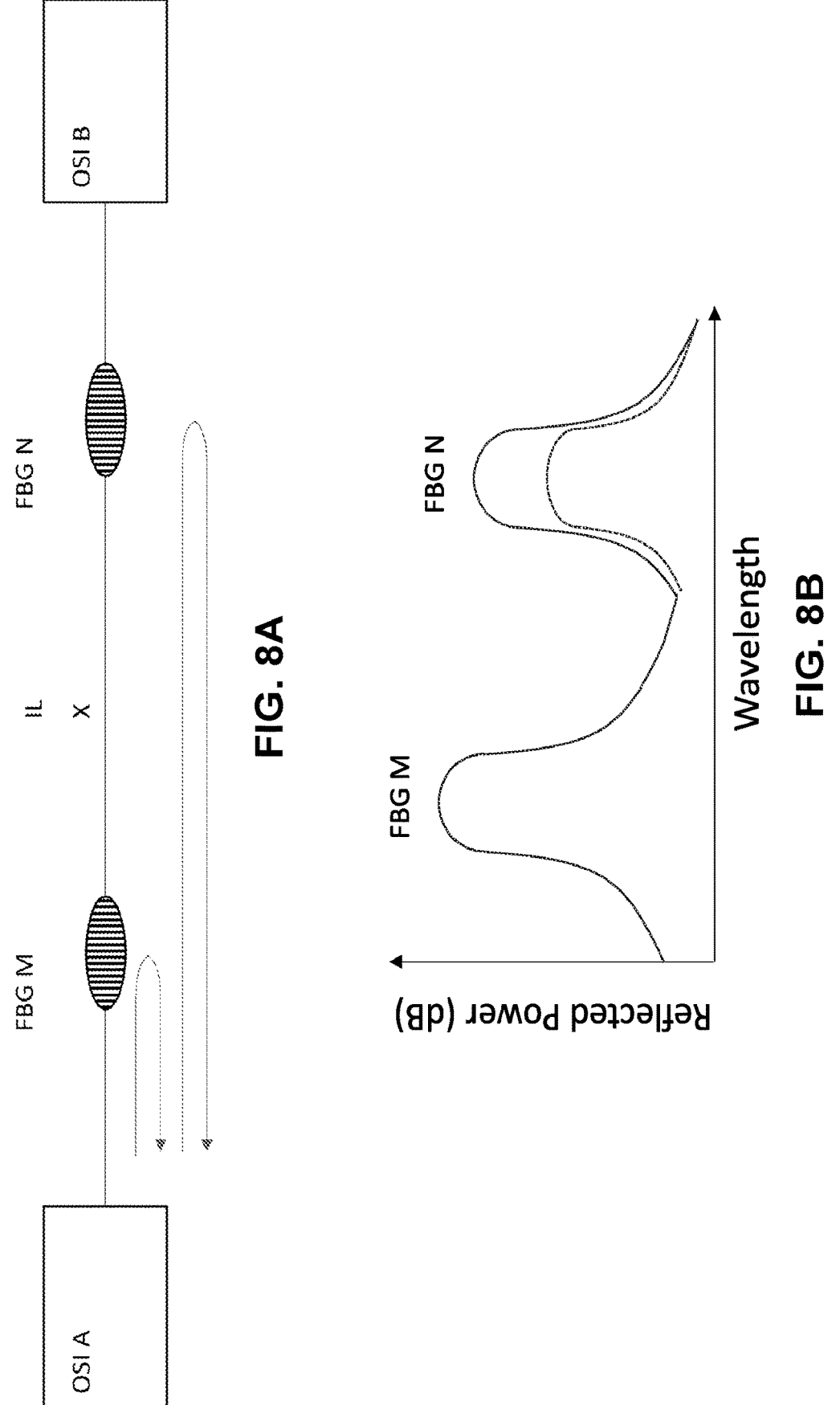

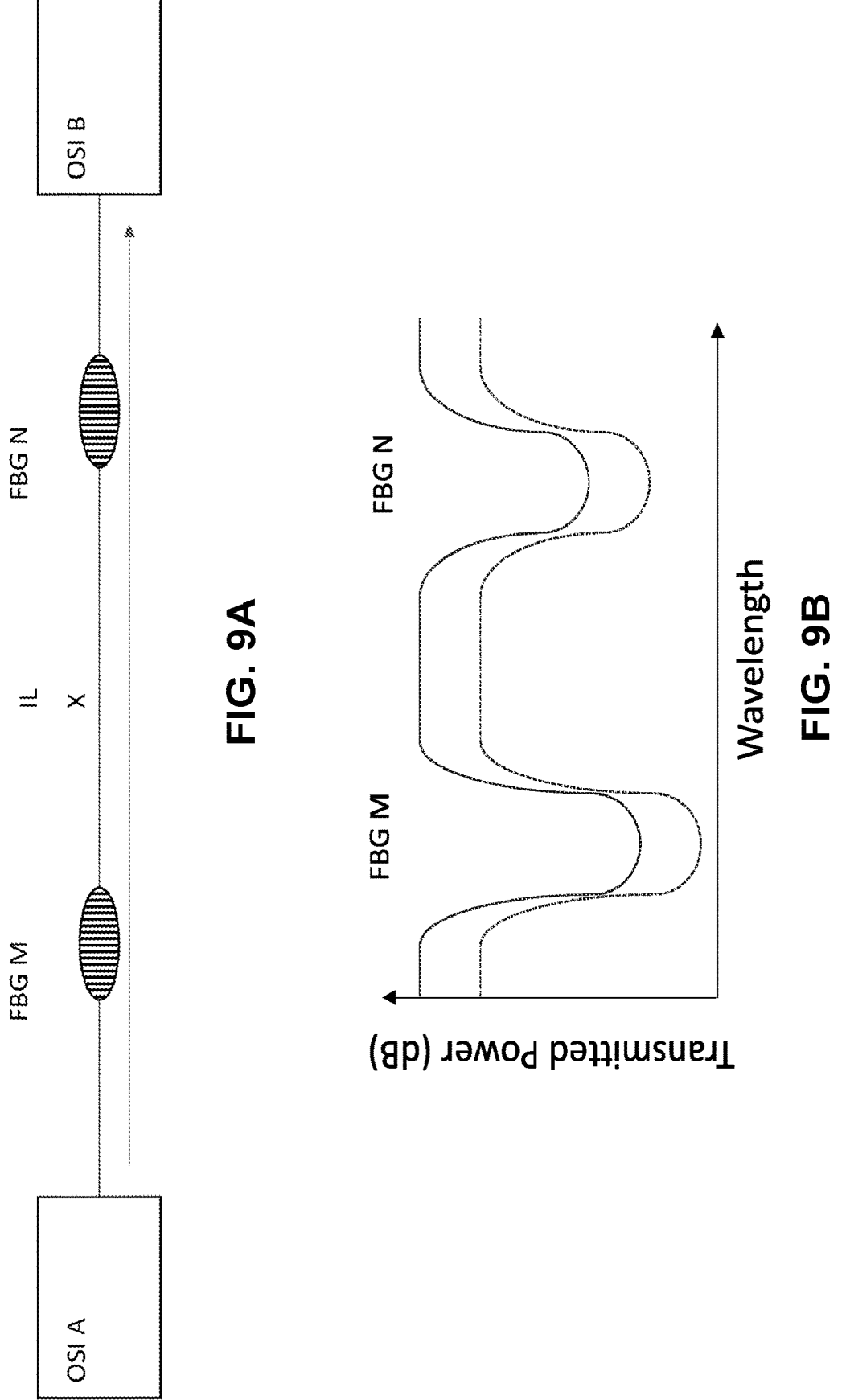

MEASURING FIBER INSERTION LOSSES IN AN OPTICAL FIBER SENSING SYSTEM

CROSS-REFERENCE TO RELATED APPLICATIONS

This application is the U.S. national phase of International Application No. PCT/US2022/047098 filed Oct. 19, 2022 which designated the U.S. and claims priority to U.S. Provisional Patent Application No. 63/257,612 filed Oct. 20, 2021, the entire contents of each of which are hereby incorporated by reference.

TECHNICAL FIELD

The technology described in this application relates to measuring fiber insertion losses in an optical fiber sensing system.

INTRODUCTION

The sensor portion of optical fiber sensing systems typically include optical fiber, sensing elements (like FBGs), and a number of opto-mechanical fiber interconnects which include fiber optic connectors and/or splices which may be mechanical or fused. A fiber interconnect also may also include an optical switch, allowing the same optical sensor interrogator to operate on multiple sensor strings. Depending upon the harshness of the deployed environment, these fiber optic interconnects may exhibit degradation over temperature, vibration, time, etc. Degradation of the fiber optic interconnects may cause loss of sensor signal strength and compromise sensor system performance and may require repair or replacement to restore performance. The ability to monitor fiber optic interconnect insertion loss in a distributed fashion to identify potential performance issues and trigger sensor maintenance has substantial value in an optical fiber sensing system.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The technology described in this application reliably and unambiguously determines the insertion loss which typically occurs at fiber interconnects, but is not limited to fiber interconnects, in multiple segments along a fiber sensor path or a fiber sensing array (i.e., one or more fiber paths) using bidirectional sensor measurements. The section of optical path for which the insertion loss is determined is defined by the path in between individual sensors, or between the optical sensing interrogator and sensor. An example embodiment uses hardware already used to sense spectral shifts along one or more fiber paths to measure and then analyze spectral data from two directions, e.g., at opposite ends of the one or more fiber paths. This technology measures fiber insertion losses accurately, reliably, efficiently, and cost effectively. It also provides measurement redundancy in case of a fiber break.

An optical fiber has at least one optical sensor with at least two interconnects with insertion losses on either side. A first optical sensing interrogator is coupled through an interconnect to one end of the optical fiber with the sensors, and a second optical sensing interrogator is coupled through an interconnect to an opposite end of the optical fiber on an opposite side of the sensors. The first optical sensing interrogator and the second optical sensing interrogator determine one or more fiber insertion losses associated with the optical path in between the sensors and the interrogators, and between sensors if there are two or more sensors, without foreknowledge of the sensor reflectivity.

The systems, methods, and devices of the disclosure each have several aspects, no single one of which is solely responsible for its desirable attributes.

Certain aspects provide a swept-wavelength, Optical Sensing Interrogator (OSI) system that can measure fiber insertion errors like connector insertion loss in a fiber optic sensing system including one or more fiber paths accurately, reliably, efficiently, and cost effectively.

BRIEF DESCRIPTION OF THE DRAWINGS

FIG. 8A depicts an example optical path with an insertion loss event between FBGs M and N.

FIG. 8B displays a reflected signal power spectrum versus wavelength measured by an OSI A with OSI A as the light source. The dashed profile for FBG B shows that increasing insertion loss between FBGs M and N diminishes the reflected magnitude of sensor N.

FIG. 9A depicts an example optical path with an insertion loss event between FBGs A and B measured by OSI B with OSI A as the light source.

FIG. 9B displays an example transmitted power spectrum versus wavelength for the scenario in FIG. 9A. The dashed profile for FBG M and FBG N shows that increasing insertion loss between sensors M and N effects the spectrum of both sensors equally since all transmitted light from OSI A to OSI B must pass through the insertion loss event.

DETAILED DESCRIPTION

In the following description, for purposes of explanation, numerous specific details are set forth in order to provide a thorough understanding of the subject innovation. It may be evident, however, that the innovation can be practiced without these specific details. Certain illustrative aspects of the innovation are described herein in connection with the following description and the drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

It is often desirable or necessary to measure fiber interconnect insertion losses in an optical sensing system array and even just along a single sensor path, particularly where limited accessibility to the sensing array or the sensor path is a factor. Insertion loss may also develop at a defect along the fiber sensor array path, for example, in response to a tight fiber bend or physical damage to the fiber cable. Insertion losses, whether associated with a fiber interconnect or a fiber cable defect, lessen the power reflecting back from or transmitting through a sensor element, and thus, can reduce the sensor signal to noise level or prevent the sensing system from working optimally.

It is also desirable to provide system diagnostics in the fiber sensing system that can identify one or more changes in the fiber sensor array insertion loss, quantify the fiber insertion losses, and locate insertion losses along one or more fiber sensor array paths accurately, reliably, efficiently, and cost effectively.

Figure 1:
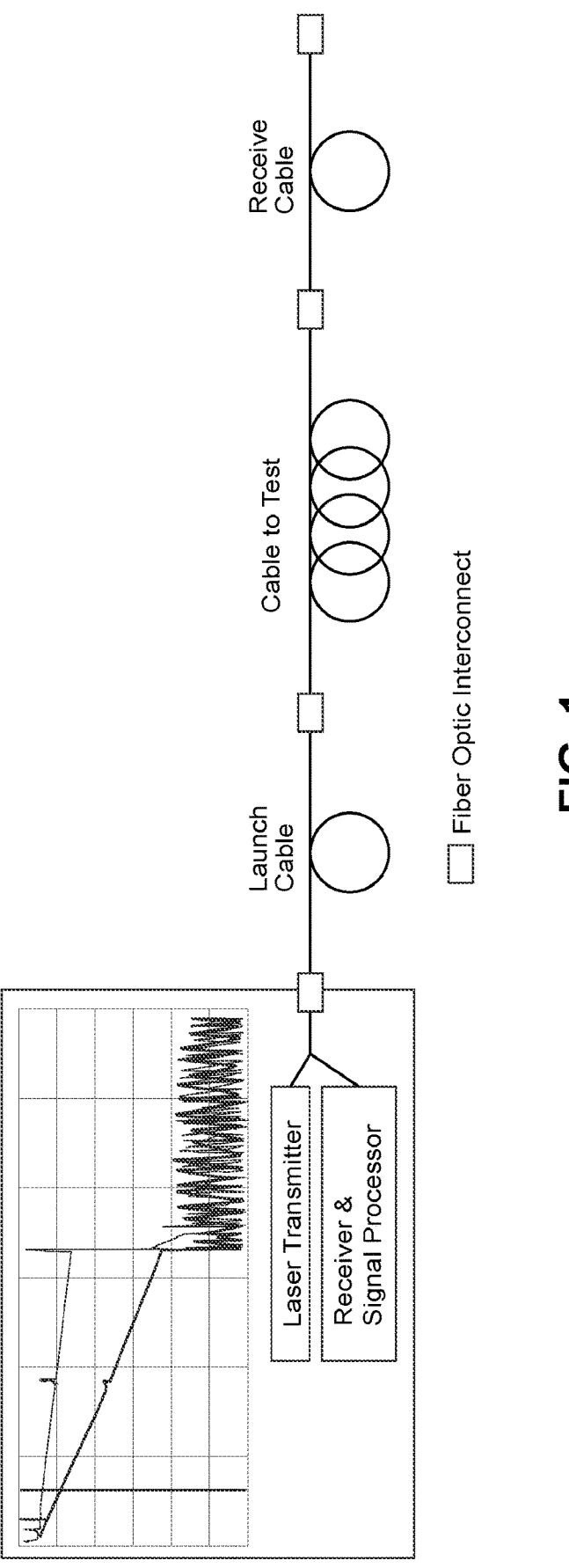
FIG. 1 is a schematic diagram of an example OTDR system.

One approach for measuring fiber insertion loss errors may use an Optical Time Domain Reflectometer (OTDR) that measures backscattered light along the fiber optic test path, with reflected light from connectors, cleaved fiber ends, other interconnects, and the Rayleigh scatter in between those events. FIG. 1 shows an example OTDR on the left coupled through a first fiber interconnect (interconnects are shown with a square symbol) to a launch fiber ("cable") coupled through a second interconnect to a fiber under test ("cable to test") coupled through a third interconnect to a receive fiber. The OTDR includes a laser transmitter that sends a pulse of light down the fiber under test. Back-scattered light and reflected light returns to the OTDR through the fiber and is directed through an optical coupler to one or more light detectors at a receiver in the OTDR. In other words, for each measurement, the OTDR sends out a high power light pulse and measures the light coming back over time. A signal processor processes the received light at the OTDR receiver which is the light scattered from the pulse passing through a region of the fiber. The speed of the pulse as it passes down the fiber may be calculated from the index of refraction of the glass in the core of the fiber, and the signal processing circuitry in the OTDR correlates the backscattered light with an actual location along the length of the fiber, and from that correlation, the OTDR may display the amount of backscattered light at any point in the fiber. The terms optical path, fiber path, and distance are used interchangeably herein because the physical distance can be readily determined from the optical path length if the index refraction of the fiber coupling the sensors to the interrogator is known.

Figure 2:
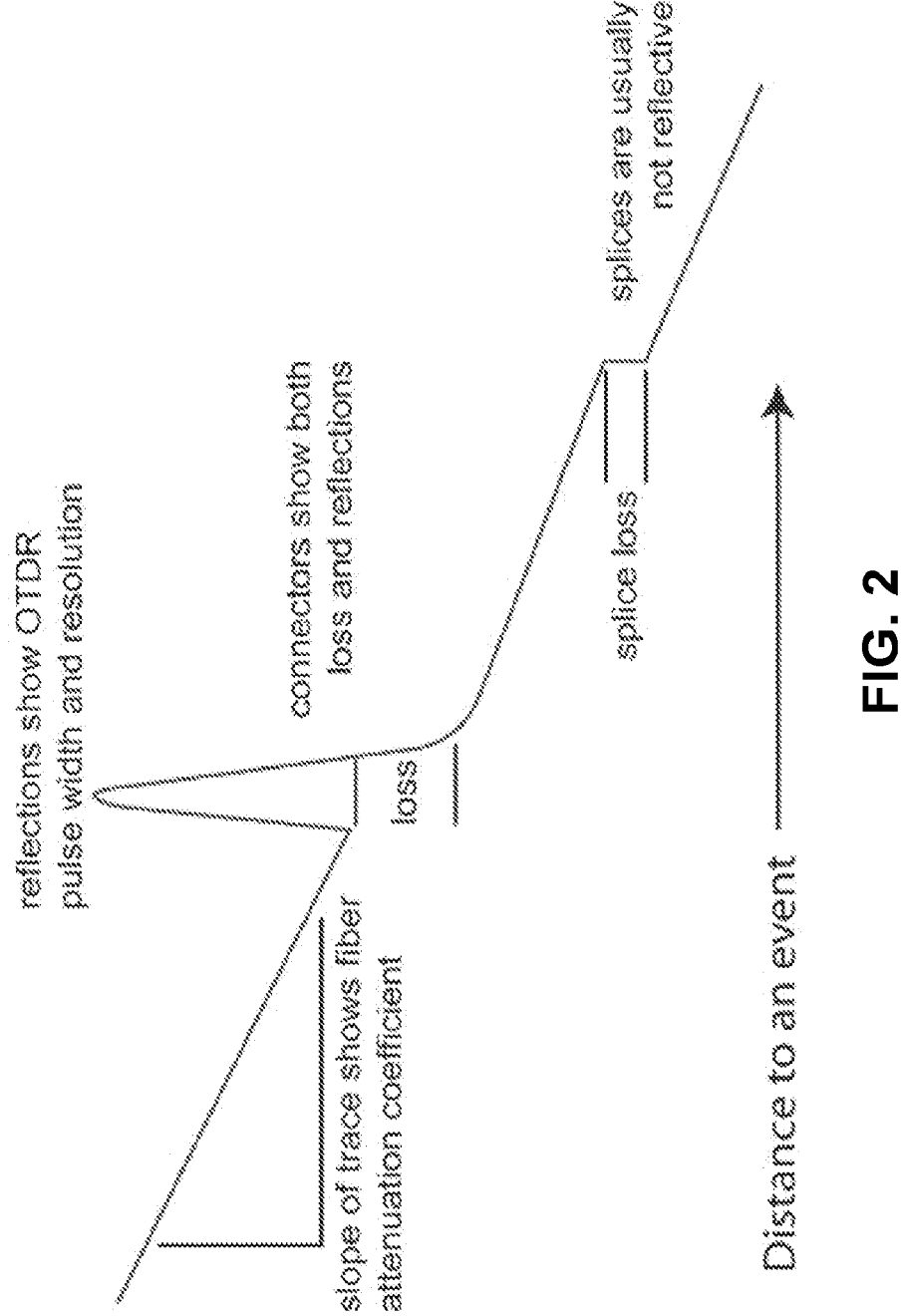
FIG. 2 shows example OTDR back reflection amplitude trace or display information with the distance along the fiber under test shown on the horizontal axis and detected power or intensity of light received and detected in the OTDR shown on the vertical axis.

FIG. 2 shows example OTDR trace or display information with the distance (e.g., measured in km or other distance metric) along the fiber under test shown on the horizontal axis and detected power or intensity (e.g., measured in dB) of the light received and detected in the OTDR shown on the vertical axis. The slope of the trace corresponds to a fiber attenuation coefficient, and the peak near the middle of the trace corresponds to a connector reflection. The width of that peak shows the pulse width of the laser pulse transmitted from the OTDR. An insertion loss in light power/intensity associated with the light traveling through the connector is also shown. Further along the length of the fiber under test, there is a splice interconnect with associated insertion loss as evidenced by a sharp loss in light power/intensity reflected from the fiber Rayleigh scatter beyond this point. Splices typically are not reflective and therefore only an interconnect loss is shown.

Figure 3B:
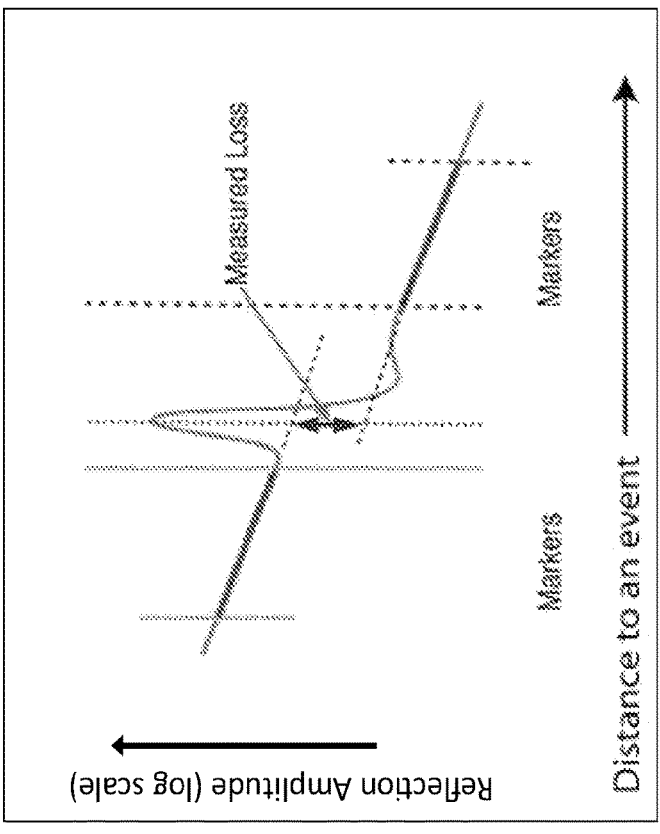
FIG. 3B illustrates a technique where the OTDR system measures splice insertion loss using a least squares method.
Figure 3A:
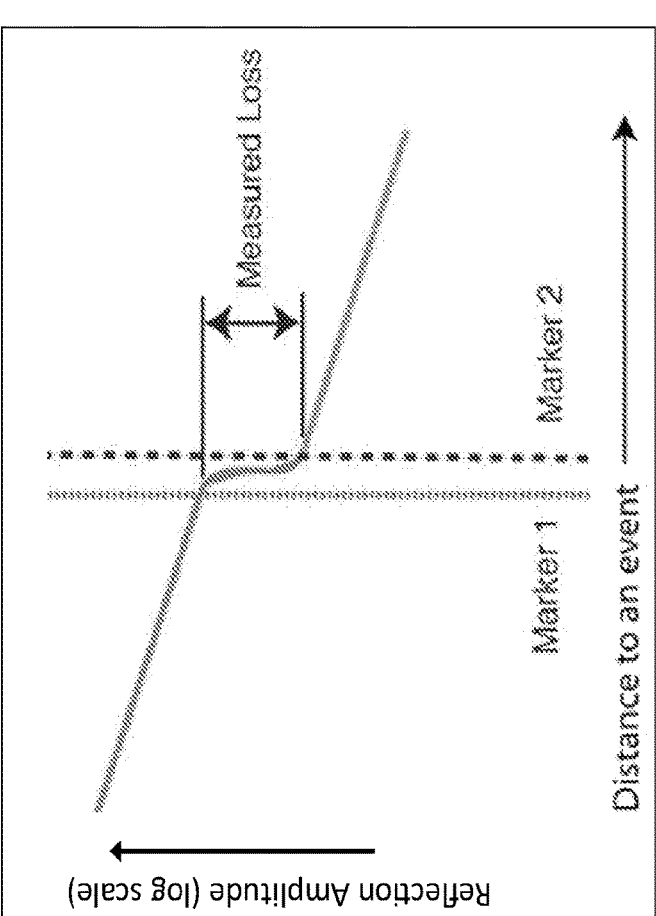
FIG. 3A illustrates a technique where the OTDR system measures splice insertion loss using a two point method.

FIG. 3A illustrates a technique where the OTDR measures splice insertion loss using a two point method. The first light power/intensity point is determined at the intersection of the dotted vertical line at the slope dip in the trace, the second light power/intensity point is determined at the dashed vertical line at the slope recovery, and the loss is the difference in light power/intensity between the two points.

FIG. 3B illustrates a technique that measures splice insertion loss using a splice loss by a least squares method. With this method, the OTDR measures distance and loss at a fiber insertion, e.g., a connector or splice, between the two markers (red and blue vertical lines), by calculating the best fit line between the two points using the least squares method to reduce noise. The markers are separated by some distance along the fiber on either side of the fiber insertion. The signal processor in the OTDR may calculate the loss by extrapolating the fiber traces on both sides of the fiber insertion without taking into account any losses in the fiber between the markers. The least squares method may set several markers, e.g., one marker at the peak, two starting markers near the beginning of the event (before the peak), and two end markers after the event (after the peak), which define the segments used for least squares analysis.

The amount of light scattered back to the OTDR is proportional to the backscatter coefficient of the fiber, the peak power of the OTDR test pulse, and the length of the pulse sent out. If more backscattered light is needed to obtain better measurements, the pulse peak power or the pulse width of the transmitted laser signal needs to be increased and/or more pulses need to be transmitted and the detected reflections averaged. An OTDR shows reflection amplitude as a function of distance, and does not generally give spectral information. OTDRs typically use a narrow band laser optical source that is not swept. FBG sensors that reflect at wavelengths different than the OTDR source wavelength may not be observable. So while an OTDR can show loss event location and magnitude, it generally is not used to show the spectral shift of an FBG sensor. Even if OTDR were to use a tunable laser to step through multiple wavelengths sending a pulse out at each wavelength to generate a map of spectrum vs. distance, this would be very time consuming and would require the expense of the pulsing element and high bandwidth receivers. Thus, including both an OTDR and an OSI in a sensor interrogation system to measure both sensor path reflected power amplitude versus distance to detect localized insertion loss and measuring reflected or transmitted power versus spectrum to detect FBG spectral shifts adds expense and complexity.

The technology described in this application reliably and unambiguously determines the optical fiber or optical fiber interconnect insertion loss at multiple points along a fiber sensor path or a fiber sensing array (i.e., one or more fiber paths) using bidirectional sensor measurements. In addition, the technology measures both FBG spectral shifts and fiber insertion loss without including time gated pulsed sources and high bandwidth receivers. An example embodiment uses hardware already used to sense spectral shifts along one or more fiber paths to measure and then analyze spectral data from two directions, e.g., at opposite ends of the one or more fiber paths. This technology measures fiber insertion losses accurately, reliably, efficiently, and cost effectively. It also provides measurement redundancy in case of a fiber break.

Figures 4, 5:
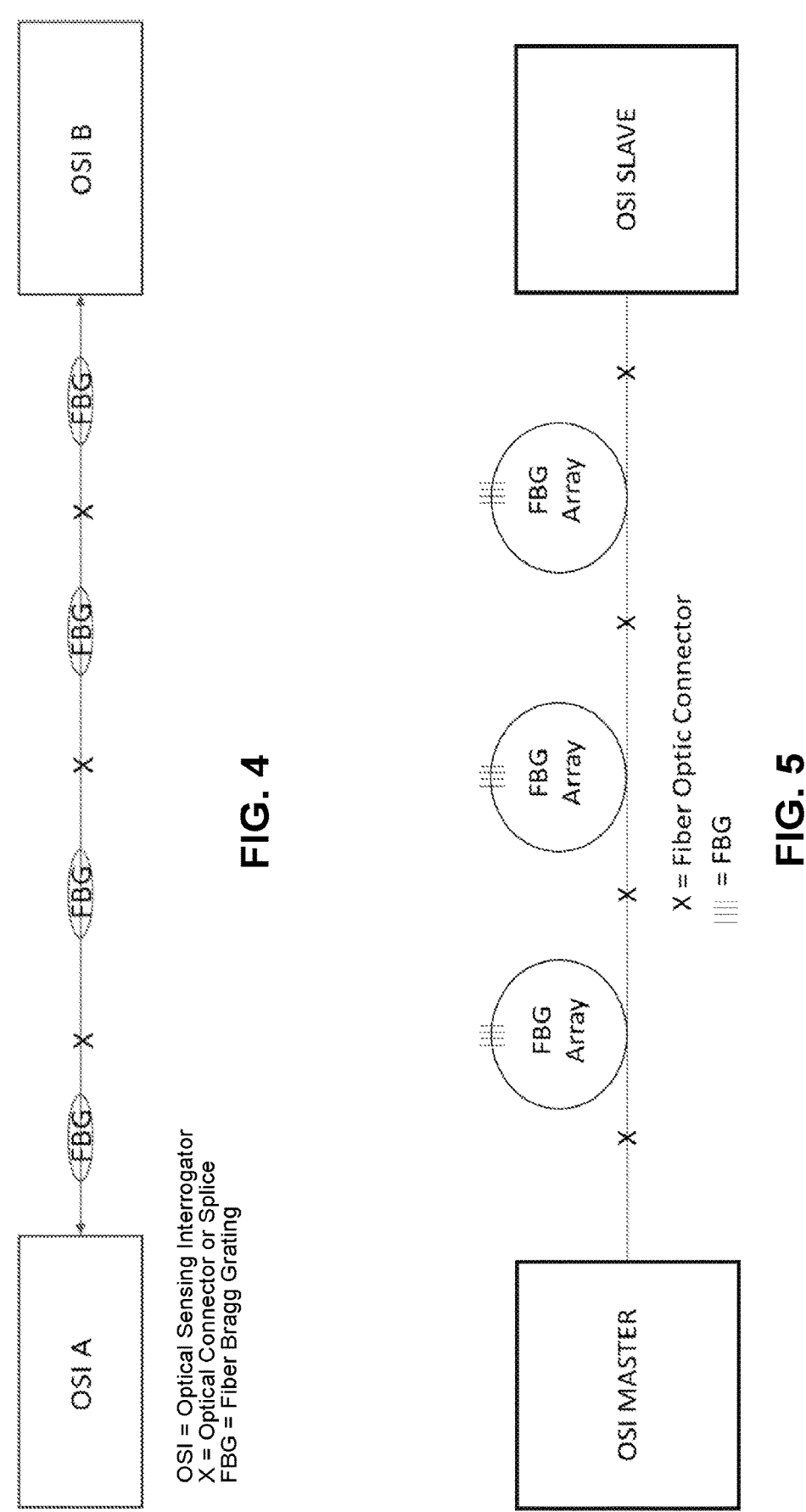
FIG. 4 is a schematic diagram of optical elements of an optical sensor interrogation (OSI) system employing a swept wavelength source that includes an OSI A at one end of the fiber path and another OSI B and the other end of the fiber path in accordance with example embodiments.
FIG. 5 shows another example embodiment of a swept-wavelength, Optical Sensing Interrogator (OSI) system that enables fiber insertion error measurements in addition to optical sensor array measurements.

Example embodiments provide a swept-wavelength, Optical Sensing Interrogator (OSI) system that enables fiber interconnect insertion loss measurements in a relatively simple manner in addition to optical sensor measurements. FIG. 4 is a schematic diagram of optical elements of an example optical sensor interrogation (OSI) system employing a swept wavelength source that includes an OSI A at one end of the fiber path and another OSI B and the other end of the fiber path. The fiber path between OSI A and OSI B includes four fiber Bragg gratings (FBGs) and three fiber interconnects (each shown with an "X"). Two additional fiber interconnects are typically present (although not shown in FIG. 4), between each OSI and the adjacent FBG. This is just an example, and the fiber path may include one or more FBGs and two or more interconnects. A fiber Bragg grating is wavelength-dependent filter/reflector formed by introducing a periodic refractive index structure within the core of an optical fiber. When light from a broad-spectrum source is incident on the grating, a portion of the light spectrum is transmitted through, and another portion of the light spectrum is reflected back. The reflected light signal will typically exhibit a narrow peak centered at the Bragg wavelength (also termed the central or characteristic wavelength) which corresponds to twice the period spacing A times the effective index of refraction for the fiber guided mode. The transmitted light signal comprises the source spectrum with a notch centered at the Bragg wavelength removed. Any change in the modal index of refraction or grating pitch of the fiber caused by strain or temperature will result in a shift in the Bragg or central wavelength characteristic of a given FBG.

Although FBGs are shown in the figures, other optical sensors that generate multiple narrow band optical signals may be used. Another example optical sensor includes fiber Fabry-Perot sensors, e.g., fiber F-P interferometers. The term optical sensor includes any sensor having a spectral output that is sensitive to a change in the environment of the sensor (temperature, pressure, strain, etc.), where a change in the spectral output (intensity, wavelength, polarization, phase, etc.) is indicative of and can be used to measure or sense a change in the environment of the sensors.

FIG. 5 shows another example embodiment of a swept-wavelength, Optical Sensing Interrogator (OSI) system that enables fiber insertion error measurements in a relatively simple and inexpensive manner in addition to optical sensor array measurements. An optical sensor array typically contains a plurality of sensing elements, such as FBGs. A sensing array may contain a plurality of FBGs each having a different Bragg or central wavelength. Alternatively, in a given sensor array may contain a plurality of sensor channels wherein FBGs in a given channel each have a different Bragg or central wavelength. A sensor array can comprise a plurality of such sensor channels. The example OSI system in FIG. 5 includes an OSI master at one end of the fiber path and an OSI slave and the other end of the fiber path. The fiber path between the OSI master and the OSI slave includes three FBG arrays and four fiber interconnects (each shown with an "X"). This is just an example, and the fiber path may include one or more FBG arrays and two or more interconnects.

Although FBGs are shown in the Figures, other optical sensors, such as Fabry-Perot sensors, may be used instead of or addition to FBGs.

Figure 6:
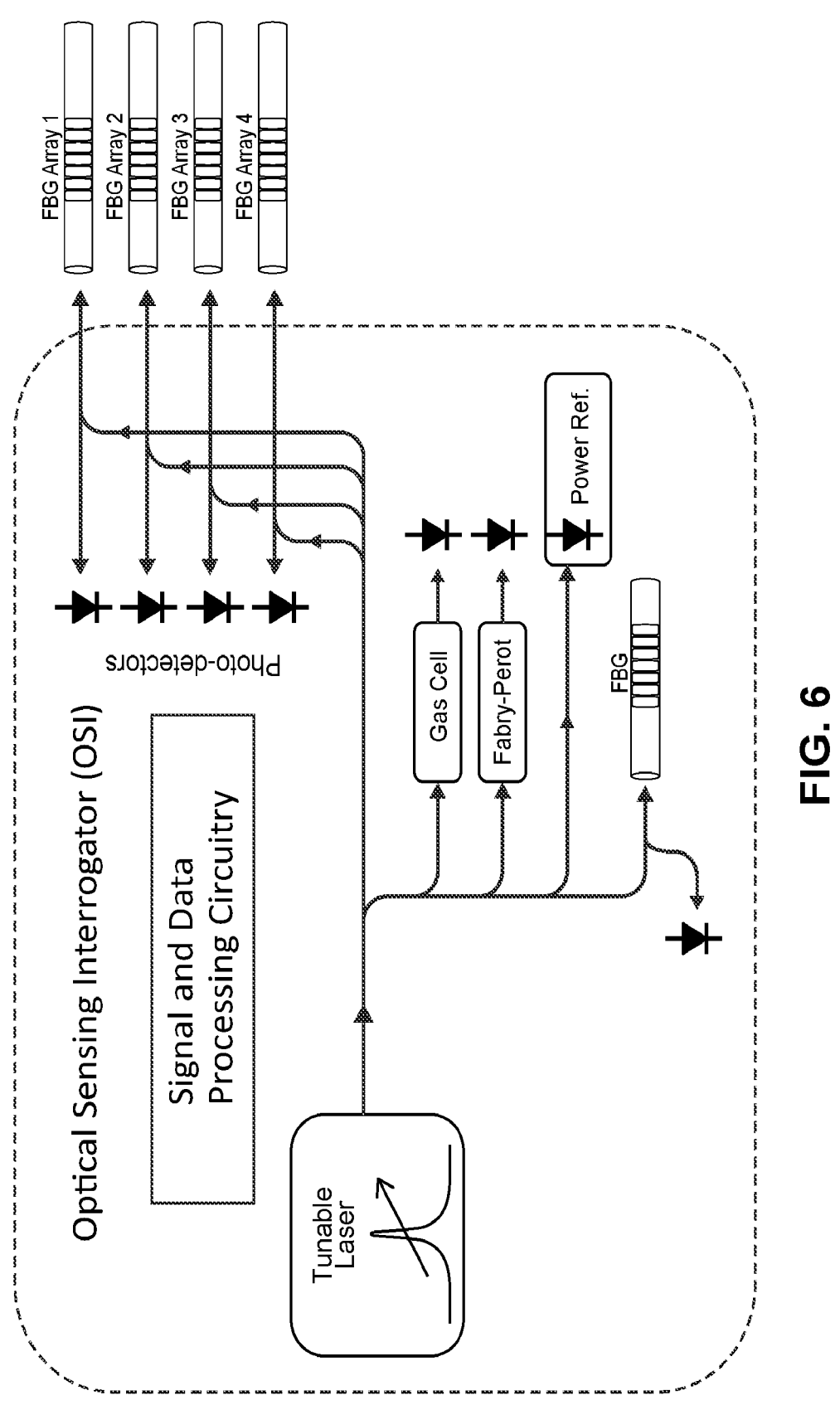
FIG. 6 is a schematic diagram of a sensor interrogation system employing a swept wavelength source.

FIG. 6 shows an example OSI apparatus coupled to four FBG arrays 1-4 that may be used for the OSIs shown in the example embodiments in FIGS. 4 and 5. A swept wavelength (i.e., a wavelength tunable) optical source is continuously monitored with an integrated optical wavelength reference. Swept wavelength optical source refers to a class of optical sources that output a narrow optical spectrum that can be electrically or mechanically tuned over a relatively wide wavelength range, generally 40 nm or more. Some example sensing applications may use sources that provide wavelengths within a range centered at 1550 nm, for example, which is a range often used for fiber optic communication applications and thus has a wide variety of available low cost optical components that may be used in the OSI. A multitude of other wavelength ranges may be used for OSIs, spanning the range of wavelengths that optical fibers can transmit with reasonably low loss. Examples of swept wavelength optical sources include swept wavelength fiber lasers, external cavity swept wavelength lasers, distributed Bragg reflector lasers (DBRLs), and broadband sources which in combination with tunable filters provide swept wavelength optical sources. See U.S. Pat. No. 7,573,021, the contents of which are incorporated herein by reference.

A wavelength tunable optical source (e.g., a swept wavelength (tunable) laser) is connected to an optical reference channel and any number of optical sensor measurement channels. Four sensor measurement channels are shown, one for each FBG array and photodetector. A sensor measurement channel can include one or more optical sensors. The optical source can be swept across a programmable (selected) wavelength range at two or more (multiple) sweep rates. A portion of the optical source signal is coupled via optical coupler to example reference channels including a wavelength reference that monitors the transmitted output wavelength versus time and includes an optical detector. A wavelength reference is an instrument that can identify and determine the wavelength of light generated by the swept optical source at a given point in the scan. Four example optical reference channels are shown because open loop control of the optical tunable filter may not provide sufficient wavelength accuracy for some sensing applications.

Gas reference cells are often used in applications where the wavelength of light needs to be accurately determined. Although spectrometers and optical spectrum analyzers are built specifically for this purpose, both should be accurately calibrated in order to yield accurate absolute wavelength measurements. A gas reference cell may include a cylindrical container (cell) containing a high purity molecular compound or atomic element. During the manufacturing of the gas reference cell, the temperature and pressure inside the cell are regulated since these factors affect the reference cell performance. A gas reference cell can serve as an absolute wavelength calibration source because the gas reference cell will only absorb light at wavelengths that correspond to the allowed transitions between energy levels of the material inside the gas reference cell. For the materials offered in reference cells, the absorption lines (wavelengths of light that are absorbed) are well known. The absolute wavelength of the absorption lines can be found in peer reviewed journals and in some cases online at www.nist.gov. In order to reproduce the absorption lines reported by these sources, the temperature and contents of the reference cell need to be the same as the cell used in the reported measurement since changes in temperature, pressure, and material can cause shifts and/or broadening of the absorption lines.

The next reference channel includes, for example, a fixed, athermal, fiber Fabry-Perot Interferometer (AFPI) shown in FIG. 6, which is an optical reference component used to generate an optical comb signal with known, stable wavelength (frequency) spacing. Peak AFPI frequencies can be measured and used to compensate for any nonlinearities in the tunable laser output wavelength versus time.

The next optical power reference channel generates a signal or signals used to normalize the optical output power of the tunable laser versus time. The optical power reference signal(s) can be used to set a dynamic laser output tracking threshold(s) for reference channel and measurement channel processing.

The fourth reference channel is an FBG reference channel that contains a single FBG used to identify a particular AFPI peak or peaks. The FBG may be thermally monitored such that its center wavelength is known over the operating temperature range of the OSI.

The optical sensor array measurement includes for each of the four FBG arrays 1-4 an optical coupler, an optical sensor (the FBG array), and an optical receiver (detector) such as a photodiode. The optical coupler couples light from the source (tunable laser) through a length of fiber to the optical sensor (the FBG array) and couples light from the sensor (the FBG array) into a photodetector. Each sensor measurement channel also contains associated signal and data processing circuitry that determines a particular characteristic of the detected sensor waveform, such as the peak, center, or 3 dB value. The time at which a particular sensor measurement is triggered is correlated to the optical source wavelength supplied via the optical reference channel. From this correlation, the data processing circuitry can generate a trace of reflection power vs. wavelength, and then analyze the trace to determine the wavelength shift of each of the sensor arrays.

In more detail, a sensor wavelength measurement is performed by comparing the time delays between signals detected on the optical reference channel with the signals processed by the sensor measurement channels. When the scan rate of the optical source is very low or the distance from the interrogator to the optical sensors is very short, there is a direct timing correlation between the optical reference channel signals and the sensor measurement signals. However, as the scan rate or sensor optical path length increases, delays caused by the finite speed of light in interconnecting optical fibers induce a delay in the returned optical signal to the detection circuitry. The use of different scan rates for the optical source results in different apparent sensor wavelength shifts, although the time of flight down the fiber for a given sensor is the same. The distance to a given sensor can be calculated employing data acquired from the same sensor for two different scan rates. In an example embodiment, iterative calculations of the time-of-flight correction for a wavelength measurement of given sensor at two different known scan rates, assuming the actual time of flight to be the same for both measurement conditions, enables accurate and reliable determination of the physical distance from the interrogation system to the sensor. This technique can be applied to measure the optical path length (and actual distance with knowledge of the index of refraction of the fiber) from each sensor in a fiber optic sensor array to the interrogation system. The optical path length to each sensor can then be used to accurately measure sensor wavelength of each sensor in an array by correcting for wavelength offset due to sensor signal time delay.

Although the OSI in FIG. 6 employs a swept optical source, other types of OSIs may also be used. For example, some OSIs use a non-swept light source with a spectrum broad enough to cover the spectral range of the sensors and an optical receiver that can discriminate the spectrum of the light received from the sensor path. An example of such a receiver is a diffraction grating aligned to a photodetector array. Any OSI that can measure the spectral profile of light reflected from or transmitted through the sensor array, with spectral resolution finer than the spectral width of the sensor elements, may be used to implement the techniques described below to determine spatially resolved insertion loss along the sensor optical path.

In example embodiments, the OSI master (OSI A) measures the FBG sensor spectral profile in reflection and the OSI slave (OSI B) measures the FBG sensor spectral profile in transmision through the FBGs. The OSI labels (A, B, Master, Slave) are arbitrary and could have been applied to either OSI. The FBG wavelengths are not identical so that they can be uniquely identified in a swept-wavelength system.

In other example embodiments, OSI A measures the FBG sensor spectral profile in reflection in one direction, and in rapid succession, OSI B measures the FBG sensor spectral profile in reflection from the opposite direction.

Figure 7B:
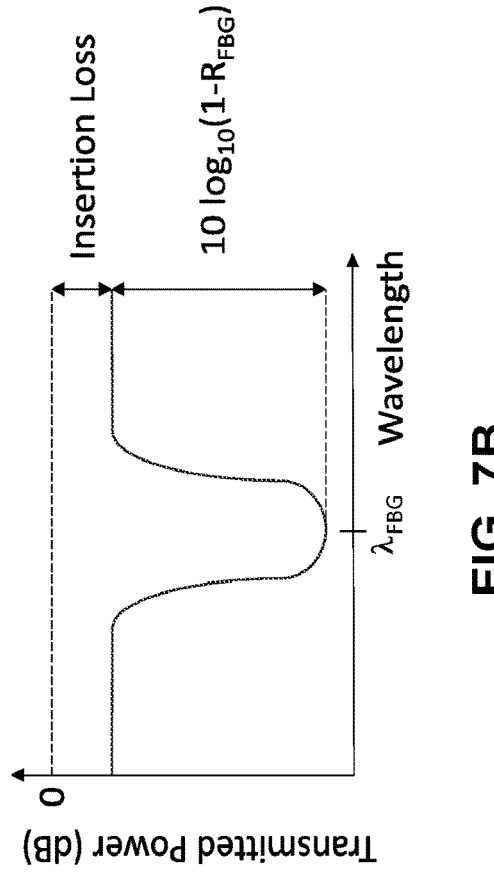
FIG. 7B depicts an example spectral response of a FBG sensor in transmission, where the spectral transmitted power is diminished by the insertion loss along the path from a master OSI though the sensor to a slave OSI.
Figure 7A:
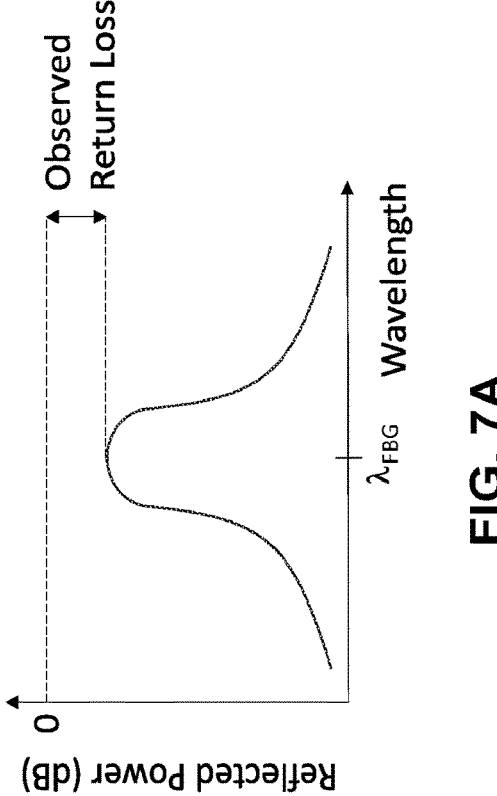
FIG. 7A depicts an example spectral response of a FBG sensor in reflection, where the peak reflected power is diminished by the insertion loss between the OSI and the FBG sensor.

FIGS. 7A and 7B illustrate example spectral profiles of a FBG centered at $\lambda_{FBG}$ in reflection and transmission, respectively. The FBG reflection profile shown in FIG. 7A is reduced in amplitude if there is insertion loss along the path between the OSI and FBG. Similarly, the transmitted power profile shown in FIG. 7B is also reduced if there is insertion loss along the path between the master OSI and slave OSI. Insertion loss at fiber optic interconnects is expected to show little variation across a spectral range comparable to the sensor spectral peak width. The depth of the negative peak relative to the transmitted power at nearby wavelengths and the height of the positive peak relative to reflected power are both related to the FBG reflectivity R.

FIGS. 8A, 8B, 9A, and 9B graphically illustrate example fiber interconnect loss measurement details using example embodiments with FBGs of differing reflectancess and with varying interconnect insertion loss. A fiber interconnect may include a connector, a splice, or an optical switch, or some combination of such devices. FIG. 8B shows an example spectrum, measured in reflection, and FIG. 9B is an example spectrum shown in transmission. More specifically, FIG. 8A shows an example insertion loss (IL) for a splice/connector between FBG M and FBG N with FBG A having higher optical power reflectivity R than FBG B. FIG. 9A illustrates an example insertion loss (IL) for a splice/connector between FBG M and FBG N with FBG M exhibiting lower peak optical power transmissivity T than FBG N.

FBGs can be described by a number of parameters. One of the parameters is reflectivity (R). Transmitted optical power, also called transmissivity (T), is related to reflected power: Transmissivity=100%−Reflectivity. Knowledge of either parameter (R or T) can be used to determine the other. In the example OSI configurations shown in FIGS. 4 and 5, the FBG transmission characteristics can be measured, and then the reflectance calculated, for example, using the equation R=1−T. This equation is valid based on an assumption that there is no light lost from the fiber at the sensor; power is either reflected or transmitted, and not absorbed or does not exit the fiber. Experimental data indicates this assumption is valid for the FBGs used to generate data shown in FIGS. 10 and 11. This relationship between R and T may be used for sensors other than FBG sensors.

Return Loss, Transmission Loss, and Insertion Loss definitions and associated calculations are described in the following paragraphs.

Return Loss (RL) is the ratio of the optical power reflected back from an event in the sensor path to the power sent from the interrogator out into the fiber expressed in Decibels (dB):

$$\text{Return Loss (in dB)} = 10\text{Log}_{10}\left(P_{received}/P_{out}\right)$$

In this expression, events with lower reflectivity (R) have RL values that are more negative. A perfect reflector (100% reflectivity) with no loss in the path to the reflector would have an RL=0 dB and a less than perfect reflector with some loss would have a negative RL. A RL spectrum is measured in reflection by an OSI and includes contributions from individual FBG sensors at specific wavelengths and broad band IL events that generally affect the entire spectrum.

Transmission Loss (TL) is a negative value of the ratio of power transmitted through the sensor to the power sent from the interrogator into the fiber expressed in Decibels (dBs):

$$\text{Transmission Loss (in dB)} = -10\,\text{Log}_{10}\left(P_{transmitted}/P_{out}\right)$$

Because of the negative sign on the right side of the equation, events with more loss have insertion loss values that are more positive. An optical path with no loss and 100% transmissivity would have TL=0 dB. A TL spectrum is measured in transmission by an OSI and includes contributions from individual FBG sensors at specific wavelengths and broad band IL events that generally affect the entire spectrum.

The term "Insertion Loss (IL)" refers to light that is lost from the optical fiber core, usually at a particular location due to light becoming unguided and escaping from a guided core mode or being absorbed. In an example practical fiber optic sensing system, optical losses are associated with interconnection points or associated with installation faults, such as a tight bend, that may worsen over time. IL is defined as the negative value of ratio of the optical power observed post to the loss event to the optical power observed prior to the loss event, for light that transmits though the event:

$$\text{Insertion Loss (in dB)} = -10\,\text{Log}_{10}\left(P_{post-event}/P_{pre-event}\right)$$

Since loss of light in the fiber core will result in the post-event power being lower than the pre-event power, IL is zero dB for no loss, and is increasingly positive value for increasing levels of attenuation. IL associated with fiber optic interconnects or bend loss events generally have spectral that varies slowly with wavelength compared to the spectral width of a FBG sensor. Insertion Loss values are known to almost always be reversible, meaning that the loss is the same no matter which way the incident light comes from. An exception to IL reversibility in fiber optics is in devices such as circulators and isolators, in which magneto-optic materials and polarizing elements are used to restrict light propagation in unwanted directions. Such devices are not used in the sensor paths described herein.

An example of calculations performed by the example OSIs to determine an example connector insertion loss is presented below. Consider an example in which two FBG sensors in a sensor array, designated FBG M and FBG N, have reflectivities of 0.4 and 0.3, respectively. The sensor Return Loss (RL) associated with the individual FBG sensor in the absence of IL is:

$$RL_M = 10*\log(0.4) = -3.98\,\text{dB}$$

$$RL_N = 10*\log(0.3) = -5.23\,\text{dB}$$

The observed Return Loss value at the OSI is not necessarily the same as the Return Loss value of the sensor because the optical power received at the OSI is reduced by loss along the path to the sensor. Thus, the insertion loss of a connector/splice between sensor FBG M and sensor FBG N may be measured by comparing the observed RL values to the known sensor RL values. For example, take the case in which a connector with 0.5 dB Insertion Loss is located between sensor FBG M and sensor FBG N, and there is no other insertion loss in the path between OSI and the sensors. The Return Loss observed at OSI A for sensor FBG N is reduced by the round-trip loss of the connector/splice (1.0 dB) minus the Return Loss of sensor FBG N (−5.23 dB):

$$RL_{AM} = -3.98\,\text{dB}$$

$$RL_{A,N} = -0.5\,\text{dB} - 5.23\,\text{dB} = -6.23\,\text{dB}$$

In the above equations, subscripts denote the OSI making the measurement (A or B) and the FBG sensor (M or N), as depicted in FIGS. 8A and 9A. The connector/splice Insertion Loss (IL) is the expected difference in RL minus the observed difference in RL, divided by 2:

$$IL_{MN} = ((-5.23\,\text{dB} + 3.98\,\text{dB}) - (-6.23\,\text{dB} + 3.98\,\text{dB}))/2 = 0.5\,\text{dB}$$

This example illustrates that if the sensor RL values independent of insertion loss in the path to the sensors is known, the observed sensor RL values can be used to determine the Insertion Loss between the sensors. The most likely source in measurement error, in this example, is due to the uncertainty in the expected sensor FBG Return Loss values in the absence of IL, $RL_M$ and $RL_N$.

The equation that describes the observed Return Loss from OSI A to sensor M, with Insertion Loss between OSI A and sensor M designated as $IL_{AM}$, at the Bragg wavelength $\lambda_{FBG}$ for sensor M, is:

$$RL_{A,M} = RL_M - 2IL_{AM}$$

If $RL_M$ is known, $IL_{AM}$ can be calculated from the value of $RL_{A,M}$. The equation that describes the observed Return Loss from OSI A to sensor N, with Insertion Loss between OSI A and sensor M designated as $IL_{AM}$, and Insertion Loss between sensor M and N designated as $IL_{MN}$, at the Bragg wavelength $\lambda_{FBG}$ for sensor N, is:

$$RL_{A,N} = RL_N - 2IL_{AM} - 2IL_{NM}$$

If $RL_N$ and $IL_{AM}$ are known, $IL_{NM}$ can be calculated from the value of $RL_{A,N}$. If there are additional sensors in the sensor array, this process of calculating Insertion Loss values in between the OSI and the first sensor and then between the next two sensors, can be repeated for each subsequent sensor until the IL values in between all of the sensors are determined.

The Return Loss values in the absence of Insertion Loss between the OSI and the sensor can be obtained from a measurement of the Transmission Loss spectrum from one OSI to the OSI on the opposite side of the sensor array. In the transmission profile in FIG. 9B of an FBG pair, the detected optical power levels are dependent on the sum of all losses in the sensor array. For the case of an OSI measurement in transmission, since the optical path between OSI A and OSI B is common for all sensors, the accumulated Insertion Loss will be the same. Similar to the treatment of sensor RL and the observed RL at an OSI, the sensor Transmission Loss (TL) associated with the individual FBG sensor at the Bragg wavelength $\lambda_{FBG}$ in the absence of IL is:

$$TL_M = -10 * \log(1 - R_M)$$

$$TL_N = -10 * \log(1 - R_N)$$

The following are equations for the observed Transmission Loss (in dB) at OSI B for sensors M and N:

$$TL_{B,M} = IL_{AM} + TL_M + IL_{MN} + IL_{NB}$$

$$TL_{B,N} = IL_{AM} + IL_{MN} + TL_N + IL_{NB}$$

In the above equations, $IL_{AM}$ refers to the total Insertion loss between OSI A and FBG sensor M, $IL_{MN}$ refers to the total Insertion Loss between FBG sensors M and N, and $IL_{NB}$ refers to the total Insertion Loss between FBG sensor N and OSI B. Unlike for observed Return Loss, observed Transmission Loss for various sensors does not depend on where the IL sources are located. Further, the reflectivity R of a FBG sensor at the Bragg wavelength $\lambda_{FBG}$ can be calculated from the difference between the transmission spectrum peak and the nearby transmission plateau, independent of IL magnitude and location, as depicted in FIG. 7B. For the example described above in which the reflectance R for FBG sensors M and N are 0.4 and 0.3, respectively, the associated FBG Transmission Loss values would be:

$$TL_M = -10 \log(1 - 0.4) = 2.22 \, dB$$

$$TL_N = -10 \log(1 - 0.3) = 1.55 \, dB$$

After the Transmission Loss for each sensor is measured, the sensor Return Loss values are computed. These sensor Return Loss values can be used to generate the expected difference in RL values between sensor pairs, and then compared with the observed values in order to determine the Insertion Loss in the path between the sensors, as described in the preceding paragraph.

In other example embodiments, reflection measurements of the sensor array can be made from both OSI A and OSI B in order to obtain the Insertion Loss in between the sensors. Consider the previous example in which two FBG sensors in a sensor array, designated FBG M and FBG N, have reflectivities of 0.4 and 0.3, respectively, and there is no Insersion Loss between the sensors and OSI A, but there is an Insertion Loss of 0.5 dB between sensors M and N. If the same two sensors M and N are observed from the opposite direction, from OSI B, and there is no Insertion Loss from OSI B to the sensors, then the observed RL for sensor N from OSI B is not impacted by the Insertion Loss between the sensors, but the observed RL for sensor M would be reduced by twice the interconnect insertion loss between the sensors:

$$RL_{B,M} = -0.5 \, dB - 3.98 \, dB - 0.5 \, dB = -4.98 \, dB$$

$$RL_{B,N} = -5.23 \, dB$$

The difference between sensor RL values observed from OSI A is (−3.98 dB+6.23 dB)=2.25 dB, and the difference between sensor RL values observed from OSI B is (−4.98 dB+5.23 dB)=0.25 dB; the Insertion Loss between the two sensors is the difference of these two differences, divided by four: (2.25 dB−0.25 dB)/4=0.5 dB. This example illustrates how observations of the same two sensors from opposite directions can determine the insertion loss occurring between them.

Consider a general case corresponding to the above example depicted in FIG. 9A in which OSI A and OSI B are at the opposite ends of a sensor array with multiple FBG sensor elements. The reflection spectra of the sensor array from both OSI A and OSI B are recorded. The Return Loss is measured for two spatially consecutive sensors N and M, designated $RL_N$ and $RL_M$, which have an Insertion Loss of $IL_{NM}$ in the fiber segment between them. Further, the Insertion loss from OSI A to sensor N is designated as $IL_{AN}$, and the Insertion Loss from OSI B to sensor M is designated as $IL_{MB}$. The Return Loss of sensors N and M observed from either OSI A or OSI B (as depicted in FIG. 8A) is dependent on the Insertion Loss in the path from the interrogators to the sensor, and the Insertion Loss in between the sensors:

$$RL_{A,M} = RL_M - 2IL_{AM}$$

$$RL_{A,N} = RL_N - 2IL_{AM} - 2IL_{NM}$$

-continued $$RL_{B,N} = RL_N - 2IL_{NB}$$

$$RL_{B,M} = RL_M - 2IL_{NB} - 2IL_{NM}$$

The difference in observed RL for each sensor is expressed as:

$$RL_{A,M} - RL_{B,M} = RL_M - 2IL_{AM} - (RL_M - 2IL_{NB} - 2IL_{NM}) = -2IL_{AM} + 2IL_{NB} + 2IL_{NM}$$

$$RL_{A,N} - RL_{B,N} = RL_N - 2IL_{AM} - 2IL_{NM} - (RL_N - 2IL_{NB}) = -2IL_{AM} - 2IL_{NM} + 2IL_{NB}$$

The actual Return Losses of the sensors have dropped out of the right-hand side of the two above equations. Subtracting these two expressions results in:

$$(RL_{A,M} - RL_{B,M}) - (RL_{A,N} - RL_{B,N}) = 4IL_{NM}$$

Thus, subtracting the sensor RL values for two spatially-adjacent sensors observed from each interrogator, and subtracting the differences, leaves four times the Insertion Loss of the path between them. This technique does not require foreknowledge of the sensor RL values or the Insertion Loss from either interrogator to either sensor. When applied to successive sensor pairs along the sensor string, the Insertion Loss between each sensor pair along the entire sensor array can be obtained.

In other example embodiments, the change in Insertion Loss between any two sensors may be measured by determining the change in observed RL values over time and then subtracting the current observed values from prior recorded values from either interrogator A or B. However, the example techniques for determining IL between two successive sensors from measurement from both sides of the sensor array described above are advantageous because no prior record is required.

Figure 10A:
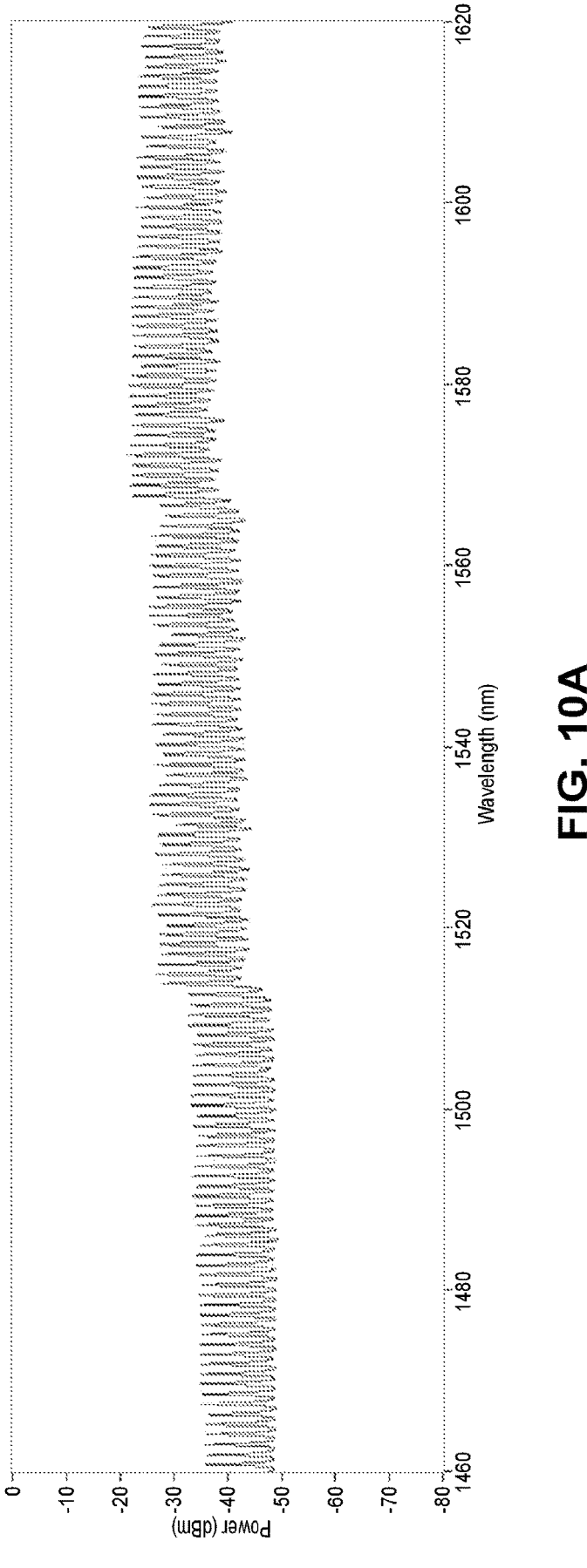
FIGS. 10A and 10B are graphs of examples of reflected optical power v. wavelength along the fiber array displaying the results of measurements made using production OSIs connected to either end of an optical sensing array including three spools of gratings inserted with LC fiber optic connectors in accordance with example embodiments.

An experiment was conducted where two Luna model si155ev OSIs designated A and B were coupled at opposite ends of a series of three FBG arrays interconnected with singlemode fiber optic connectors (similar to the arrangement in FIG. 5). Connector insertion loss was varied by manually inducing a gap between pairs of the connectors. The reflected FBG array spectrum measured by OSI A is illustrated in FIG. 10A as a graph of optical power as a function of swept wavelength. The reflected FBG array spectrum measured by OSI B is illustrated in FIG. 10B as a graph of optical power as a function of swept wavelength (larger amplitude trace), while the transmitted spectrum, measured by OSI B, is displayed by the smaller amplitude trace in FIG. 10B.

Figure 10B:
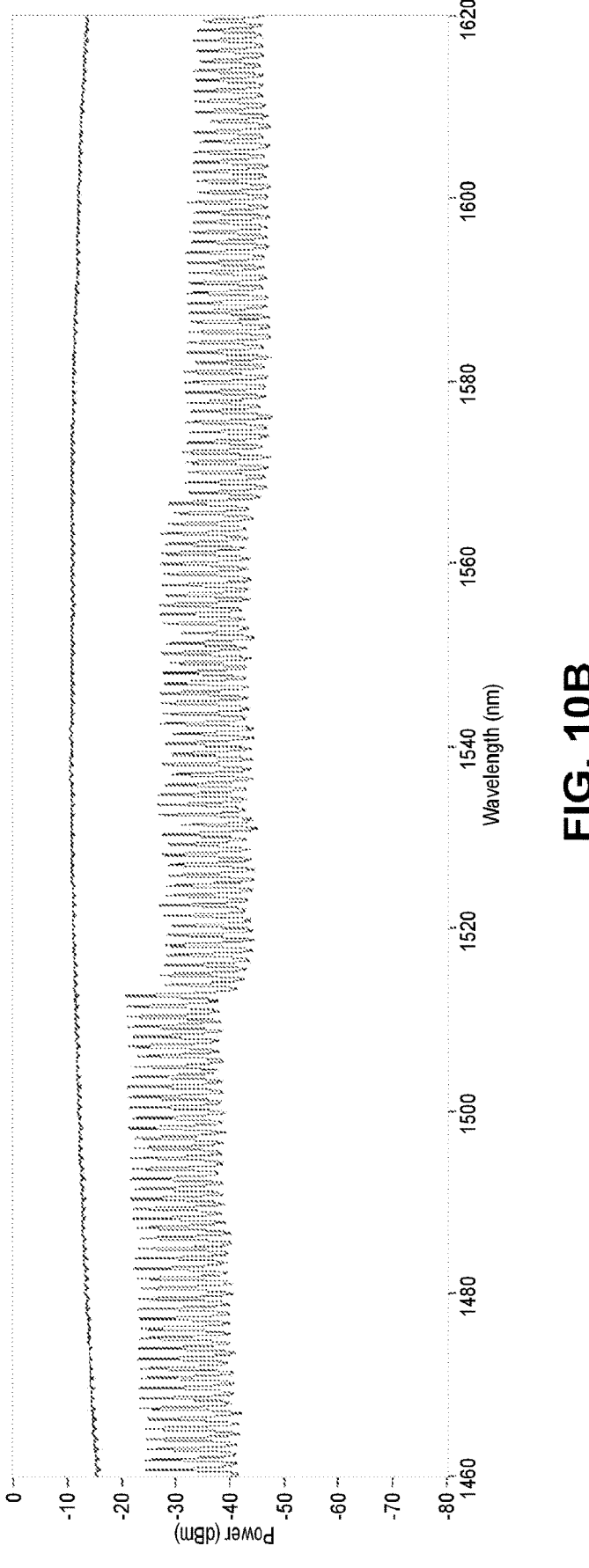
Figure 11:
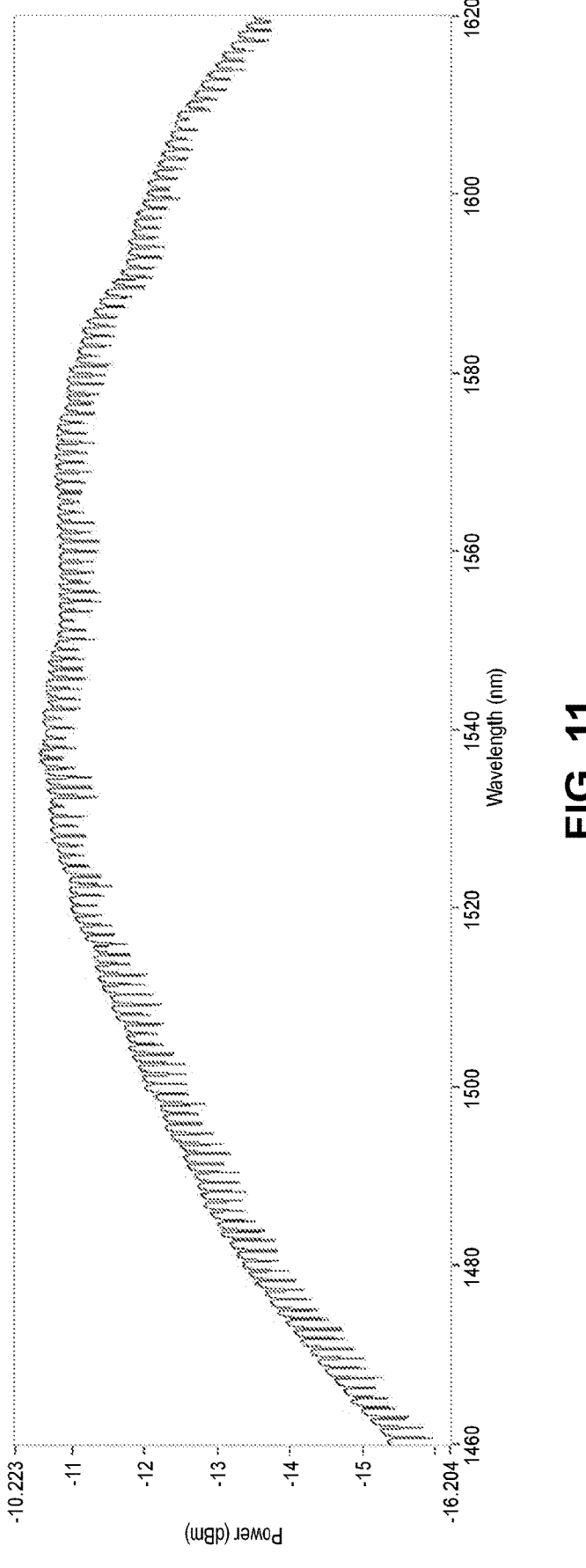
FIG. 11 shows a graph of an example of optical power v. wavelength along the fiber array measured from OSI A to OSI B for a portion of the transmission spectrum shown in FIG. 10.

FIG. 11 is a zoomed-in view of the smaller amplitude trace shown in FIG. 10B. Note the amplitude discontinuities shown in the reflected FBG array spectrums, the larger amplitude traces in FIGS. 10A and 10B, at roughly 1515 nm and 1567 nm, due to connector losses at corresponding locations along the array. The FBG array transmision profiles, the smaller amplitude traces in FIGS. 10B and 11, do not reveal any discontinuities for the identical path. Therefore, the measured transmission spectrum can be used to determine the reflectivity of the FBGs in the array, and more specifically, the FBGs located "before" and "after" a splice/connector of interest. The physical locations of the IL events (in this case, two gapped fiber optic connectors) are determined from knowledge of the physical locations of the sensors on either side of the RL trace discontinuites. In this example, the FBG sensor wavelengths were chosen so that sensors with increasing wavelength were located at an increasing distance from one of the OSIs. However, this ordering is not needed in practice for the described IL amplitude and location determination techniques to work. Any ordering of sensor wavelength with distance will work so long as the ordering is known, the sensor reflection wavelengths do not overlap, and the sensor spectral shape does not distort as the sensor wavelength shifts in response to environmental stimuli.

There are many applications for the technology described above including any applications with fiber paths containing FBGs. For example, high availability fiber optic sensing systems, such as aerospace, security, medical, etc., applications, can achieve improved operational performance with a redundant design. For example, the two systems shown in FIGS. 4 and 5 with two Optical Sensing Interrogators (OSIs), one on each end of a point-to-point fiber sensor array, can advantageously continue to monitor the fiber path if a single fault (high loss feature) occurs. Additional features, such as fault location and predictive monitoring, may be implemented.

The technology described above provides an Optical Sensing Interrogator (OSI) system that can measure fiber insertion losses in a fiber optic system equipped with Fiber Bragg Gratings (FBG) and/or Fabry-Perot (FP) etalons, including one or more fiber paths accurately, reliably, efficiently, and cost effectively. In such an optical sensing system using reflective sensors (FBG, FP) to measure a particular physical quantity, the technology advantageously allows for the simultaneous measurement of insertion losses without disruption of the sensor monitoring function.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments.

Consistent with the foregoing, whenever it is described in this document that an action "may," "can," or "could" be performed, that a feature, element, or component "may," "can," or "could" be included in or is applicable to a given context, that a given element "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed elements (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements are also not optional.

The claims are not intended to invoke means-plus-function or step-plus-function construction/interpretation unless they expressly use the phrase "means for" or "step for." Claim elements intended to be construed/interpreted as means-plus-function language or step-plus-function, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action. In some embodiments, the physical state of configuration of the hardware element may be specified through storing (e.g., in a memory device) program code (e.g., firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Although process steps, algorithms or the like may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. Apparatus comprising:
an optical fiber;
at least one optical sensor included with the optical fiber at a first location;
a first fiber interconnect in the optical fiber, the first fiber interconnect associated with an insertion loss;
a first optical sensing interrogator coupled by the interconnect to one end of the optical fiber on one side of the at least one optical sensor; and
a second optical sensing interrogator coupled to an opposite end of the optical fiber on an opposite side of the at least one optical sensor and the first fiber interconnect,
wherein the first optical sensing interrogator and the second optical sensing interrogator are configured to determine one or more fiber insertion loss values associated with at least the first fiber interconnect.

2. The apparatus in claim 1, further comprising:
a second fiber interconnect in the optical fiber,
wherein the first fiber interconnect is positioned on the one side and the second fiber interconnect is positioned on the opposite side.

3. The apparatus in claim 1, further comprising:
multiple optical sensors included with the optical fiber, and
at least one fiber interconnect with an insertion loss located in the optical fiber on each side of each of the multiple optical sensors.

4. The apparatus in claim 1, wherein the at least one optical sensor is a fiber Bragg grating.

5. The apparatus in claim 1, wherein the at least one optical sensor is a fiber Bragg grating sensing array.

6. The apparatus in claim 1, wherein first fiber interconnect is an optical connector or an optical splice.

7. The apparatus in claim 1, wherein one of the first optical sensing interrogator and the second optical sensing interrogator is configured to measure a transmission profile of the optical fiber, and the other of the first optical sensing interrogator and the second optical sensing interrogator is configured to measure a reflection profile of the optical fiber.

8. The apparatus in claim 1, wherein one of the first optical sensing interrogator and the second optical sensing interrogator is configured to inject a wavelength varying signal into the optical fiber which is transmitted through the fiber, the at least one optical sensor, and the first fiber interconnect.

9. The apparatus in claim 8, wherein the other of the first optical sensing interrogator and the second optical sensing interrogator is configured to detect the wavelength varying signal and reflected signals from the optical fiber.

10. The apparatus in claim 9, wherein at least one of the first optical sensing interrogator and the second optical sensing interrogator is configured to detect one or more differences between optical sensor reflected signal levels, where the one or more differences correspond to a measure of the fiber interconnect insertion loss.

11. A method comprising:
coupling a first optical sensing interrogator one end of an optical fiber on one side of at least one optical sensor included with the optical fiber at a first location and a first fiber interconnect in the optical fiber, the first fiber interconnect associated with an insertion loss;
coupling a second optical sensing interrogator coupled to an opposite end of the optical fiber on an opposite side of the at least one optical sensor and the first fiber interconnect; and
determining one or more fiber insertion loss values associated with at least the first fiber interconnect using the first optical sensing interrogator and the second optical sensing interrogator.

12. The method in claim 11, further comprising:
positioning the first fiber interconnect on the one side, and positioning a second fiber interconnect in the optical fiber on the opposite side.

13. The method in claim 11, wherein the optical fiber includes multiple optical sensors and at least one fiber insertion loss measurement for a fiber segment on each side of each of the multiple optical sensors.

14. The method in claim 11, wherein the at least one optical sensor is a fiber Bragg grating.

15. The method in claim 11, wherein the at least one optical sensor is a fiber Bragg grating sensing array.

16. The method in claim 11, wherein first fiber insertion loss measurement is of an optical connector or an optical splice.

17. The method in claim 11, further comprising:
one of the first optical sensing interrogator and the second optical sensing interrogator measuring a transmission profile of the optical fiber, and
the other of the first optical sensing interrogator and the second optical sensing interrogator measuring a reflection profile of the optical fiber.

18. The method in claim 11, further comprising:
one of the first optical sensing interrogator and the second optical sensing interrogator injecting a wavelength varying signal into the optical fiber which is transmitted through the fiber, the at least one optical sensor, and the fiber interconnects.

19. The method in claim 18, further comprising:
the other of the first optical sensing interrogator and the second optical sensing interrogator detecting the wavelength varying signal and reflected signals from the optical fiber.

20. The method in claim 19, further comprising:
at least one of the first optical sensing interrogator and the second optical sensing interrogator detecting one or more differences between optical sensor reflected signal levels, where the one or more differences correspond to a measure of fiber insertion loss.

* * * * *